US009743505B2

(12) United States Patent
Laurisch et al.

(10) Patent No.: US 9,743,505 B2
(45) Date of Patent: Aug. 22, 2017

(54) PLASMA TORCH

(71) Applicant: Kjellberg-Stiftung, Finsterwalde (DE)

(72) Inventors: Frank Laurisch, Finsterwalde (DE); Timo Grundke, Finsterwalde (DE); Rene Nogowski, Dersden (DE); Volker Krink, Finsterwalde (DE)

(73) Assignee: KJELLBERG-STIFTUNG, Finsterwalde (DE)

( * ) Notice: Subject to any disclaimer, the term of this patent is extended or adjusted under 35 U.S.C. 154(b) by 0 days.

(21) Appl. No.: 15/001,277

(22) Filed: Jan. 20, 2016

(65) Prior Publication Data

US 2016/0227640 A1 Aug. 4, 2016

(30) Foreign Application Priority Data

Jan. 29, 2015 (EP) .................................... 15153044

(51) Int. Cl.
*B23K 10/00* (2006.01)
*H05H 1/34* (2006.01)
*H05H 1/48* (2006.01)

(52) U.S. Cl.
CPC ............ *H05H 1/3405* (2013.01); *H05H 1/34* (2013.01); *H05H 1/48* (2013.01); *H05H 2001/3494* (2013.01)

(58) Field of Classification Search
CPC .......... H05H 1/3405; H05H 1/34; H05H 1/48; H05H 2001/3494
USPC ....... 219/121.39, 121.45, 121.51, 121.55, 75
See application file for complete search history.

(56) References Cited

U.S. PATENT DOCUMENTS

| | | | | |
|---|---|---|---|---|
| 4,692,584 | A | 9/1987 | Caneer, Jr. | |
| 4,775,774 | A | 10/1988 | Caneer, Jr. | |
| 6,772,040 | B1 * | 8/2004 | Picard | H05H 1/36 219/121.11 |
| 9,446,472 | B2 * | 9/2016 | Winn | B23K 10/00 |
| 2006/0091115 | A1 * | 5/2006 | Higgins | B23K 10/00 219/121.5 |
| 2006/0163216 | A1 * | 7/2006 | Brandt | H05H 1/34 219/121.39 |
| 2016/0221108 | A1 * | 8/2016 | Hoffa | B23K 10/006 |
| 2017/0001255 | A1 * | 1/2017 | Winn | B23K 10/006 |

FOREIGN PATENT DOCUMENTS

| | | |
|---|---|---|
| EP | EP0146278 B1 | 7/1988 |
| WO | WO91/16166 | 10/1991 |

* cited by examiner

*Primary Examiner* — Mark Paschall

(74) *Attorney, Agent, or Firm* — Jacobson Holman, PLLC.

(57) ABSTRACT

The invention relates to a plasma torch, preferably to a plasma cutting torch, in which a plasma gas PG1 and/or PG2 flows through at least one feed through a housing of the plasma torch gas up to a nozzle opening. A hollow space connected to the feed(s) is also present within the housing and a valve which opens and closes an opening is arranged at the opening at said hollow space and a leading off of plasma gas PG1 and/or PG2 out of the feed(s) up to the nozzle opening can be achieved in the open state of this valve.

12 Claims, 9 Drawing Sheets

Figure 3

PLASMA TORCH

Figure 1:
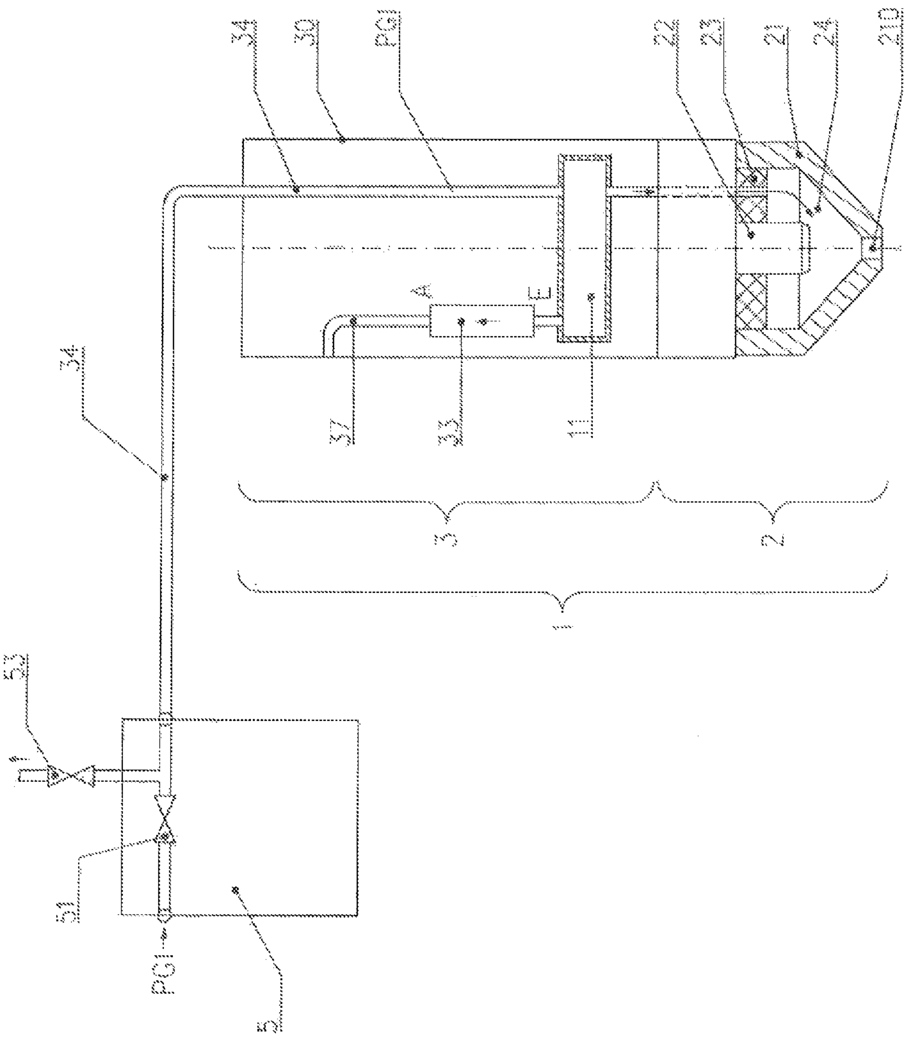

The invention relates to a plasma torch, in particular to a plasma cutting torch.

A plasma is a thermally highly heated electrically conductive gas which is composed of positive and negative ions, electrons and excited and neutral atoms and molecules. Various gases, for example monoatomic argon and/or the diatomic gases hydrogen, nitrogen, oxygen or air are used as a plasma gas. These gases ionize and dissociate by the energy of an electrical arc. The electrical arc constricted by a nozzle is then called a plasma jet. The parameters of the plasma jet can be highly influenced by the design of the nozzle and of the electrode. These parameters of the plasma jet are, for example, the jet diameter, the temperature, the energy density and the flow speed of the gas.

During plasma cutting the plasma is as a rule constricted by means of a nozzle which can be gas cooled or water cooled. Energy densities up to 2×106 W/cm$^2$ can thereby be achieved. Temperatures arise in the plasma jet of up to 30,000° C. which allow very high cutting speeds on materials in combination with the high flow speed of the gas.

Plasma torches typically comprise a plasma torch head and a plasma torch shaft. An electrode and a nozzle are fastened in the plasma torch head. The plasma gas flows between them and exits through the nozzle bore. The plasma gas is typically guided through a gas guide which is attached between the electrode and the nozzle and which can be set into rotation.

Arrangements are also known in which valves, preferably electromagnetically operated valves, switch over or regulate the plasma gas. They are located outside the torch shaft/ torch housing in an assembly. These valves can, for example, be fastened in an assembly at the hose packet. It is equally known that these valves are attached to a coupling unit between the gas hoses of the plasma torch and the supply hoses for the gas supply.

It is equally known that a plurality of valves for the plasma gas is used. They are e.g. a gas for the ignition and a gas for the cutting. Oxygen is used as the plasma gas for the plasma cutting. The plasma can be ignited using air or nitrogen and cutting can be performed using oxygen. There is also the possibility of mixing gases, which is used, for example with argon and hydrogen in the cutting of alloyed steels. It is also known that the respective hose line should be vented for a change between different plasma gases which is as fast as possible.

It is disadvantageous in the known solutions that a fast switching over between the gases and a fast venting of the plasma gas space in the interior of a plasma head/housing whose volume is formed by the lines or bores or in an another manner between the nozzle bore and the valves is not possible in a sufficiently short time. It can in particular take several 100 ms, in part even up to 1 sec, with smaller diameters of the nozzle bore until the pressure in this space is reduced to below 0.5 bar. During shut-down processes, it is often desired at the end of cutting to switch off the plasma arc at pressures of the plasma gas PG1 or of the plasma gases PG1 and PG2 which are as low as possible to minimize the wear of the electrode. It is also a further disadvantage that the lengths of the lines influence the time until the desired reduced pressure has been reached. Long line lengths prolong the time, but are frequently necessary due to the different kinds of guidance systems such as robots or CNC controlled xy guide machines with and without a pivot unit for bevel cutting.

The attachment of valves to the plasma torch shaft is unfavorable for the fastening in the guidance system; it is in particular disruptive with pivot units.

It is therefore the object of the invention to provide possibilities for improved conditions on the shutting down, on the switching over or on variations in a controlled or regulated operation of a plasma torch in the supply of plasma gas.

In accordance with the invention, this object is achieved by a plasma torch having the features set forth in the independent and subordinate claims.

In the plasma torch in accordance with the invention, a plasma gas PG1 is guided through at least one feed and/or through a housing of the plasma torch and through a hollow space which is formed within the housing and which communicates with or is connected to a nozzle opening. At least one valve for opening and closing the respective feed can be present in the at least one feed. These valves for opening and closing the feed(s) can be arranged outside the plasma torch and/or within the housing.

A hollow space which has an opening is formed within the housing in a manner connected to the feed(s). The opening should preferably be led outwardly out of the housing. A valve opening and closing the opening is arranged within the housing at the hollow space. With an open valve, plasma gas can be led off via this opening out of the feed(s) up to the nozzle opening in certain operating states, in particular on the change of operating states, and a venting can be achieved there.

Since the opening can be guided outwardly outside the housing, optionally via a further line, it can simply communicate with the environment in the simplest case when the valve connected thereto is open. It can, however, also be connected to a unit generating a vacuum and/or to a container in which a pressure is maintained beneath the pressure in the feed( )s), preferably in the region in front of the nozzle opening and below the ambient pressure.

At least one pressure sensor can be arranged within or connected to the at least one feed and/or the hollow space and the electrical current and/or the electrical voltage and/or the gas itself, with which the plasma torch is operated, can preferably be controlled and/or regulated using said pressure sensor. The pressure and/or the volume flow of the supplied plasma gas(es) or of the secondary gas can be controlled or regulated solely or additionally in dependence on the pressure thus determined.

There is also the possibility that a further feed for a secondary gas SG is guided through the housing. Secondary gas SG can be led to the outside by means of a nozzle protection cap and a secondary gas feed formed in the nozzle protection cap next to a plasma jet which exits through the nozzle opening. A valve for opening and closing should likewise be connected to the secondary gas feed.

The valves for the supply of plasma gas and optionally for secondary gas should preferably be able to be regulated or controlled.

In addition to the valve present at the hollow space or at the opening, at least one valve for opening and closing a feed for a plasma gas PG1 and/or PG2 can also be arranged within the housing in the direction of flow of the respective plasma gas PG1, PG2 in the respective feed before a connection to the hollow space. These valves arranged within the housing should preferably be able to be actuated electrically, pneumatically or hydraulically and should particularly preferably be configured as axial valves. Electrically actuable valves can be controlled electromagnetically or while utilizing the piezoelectric effect.

The at least one valve arranged in the housing, that is a valve arranged in a feed or at the hollow space or at the opening, should have a maximum outer diameter or a mean maximum surface diagonal of 15 mm, preferably a maximum of 11 mm and/or a maximum length of 50 mm, preferably a maximum of 40 mm, particularly preferably a maximum of 30 mm and/or the maximum outer diameter or the maximum mean surface diagonal of the housing should amount to 52 mm. The maximum outer diameter should amount to a maximum of ¼, preferably a maximum of ⅕, of the outer diameter of the housing. The valves should have a maximum electrical power consumption of 10 W, preferably of 3 W, preferentially of 2 W.

A mean maximum surface diagonal can be understood with non-rotationally symmetrical cross-sections as the mean value of all surface diagonals of the respective cross-section. The numerical values given should apply 1:1 to outer diameters and for the surface diagonals the specific values should be a maximum of 15% larger than the given outer diameter values.

With an electrically operable valve, plasma gas (PG1, PG2) or secondary gas should flow through the winding of a coil, whereby a cooling can be achieved.

The hollow space can have a reduced free cross-section in the direction of flow before the valve present thereat. A reduced free cross-section can, however, also be present in the direction of flow after the valve at the opening. The venting time can be influenced by a free cross-section thus reduced. A diaphragm reducing the free cross-section can also be arranged there. The time in which plasma gas can escape with a valve open at the hollow space can in particular be increased with a reduced free cross-section or with a diaphragm to ensure that plasma gas is still present in a space as long as electrical voltage is still applied to the electrode and/or as long as an electrical current flows through the electrode. The service life of the electrode can thereby be increased and critical operating states with too fast an escape of plasma gas can be avoided.

The plasma torch in accordance with the Invention can also be configured as a quick-change torch having a plasma torch shaft separable from a plasma torch head. A simple and fast adaptation to changed desired processing conditions or processing demands can thus be achieved by a simple exchange of components.

If a venting procedure is to be carried out, valves should first be closed in the feeds for plasma gas and optionally for secondary gas before the valve integrated or arranged in the hollow space is opened. These valves can optionally be closed simultaneously and the one valve can be opened in this respect.

The invention will be explained better in the following with reference to examples. The respective embodiments and technical features of the different examples can be combined with one another independently of the respective individually described example.

Figure 2:
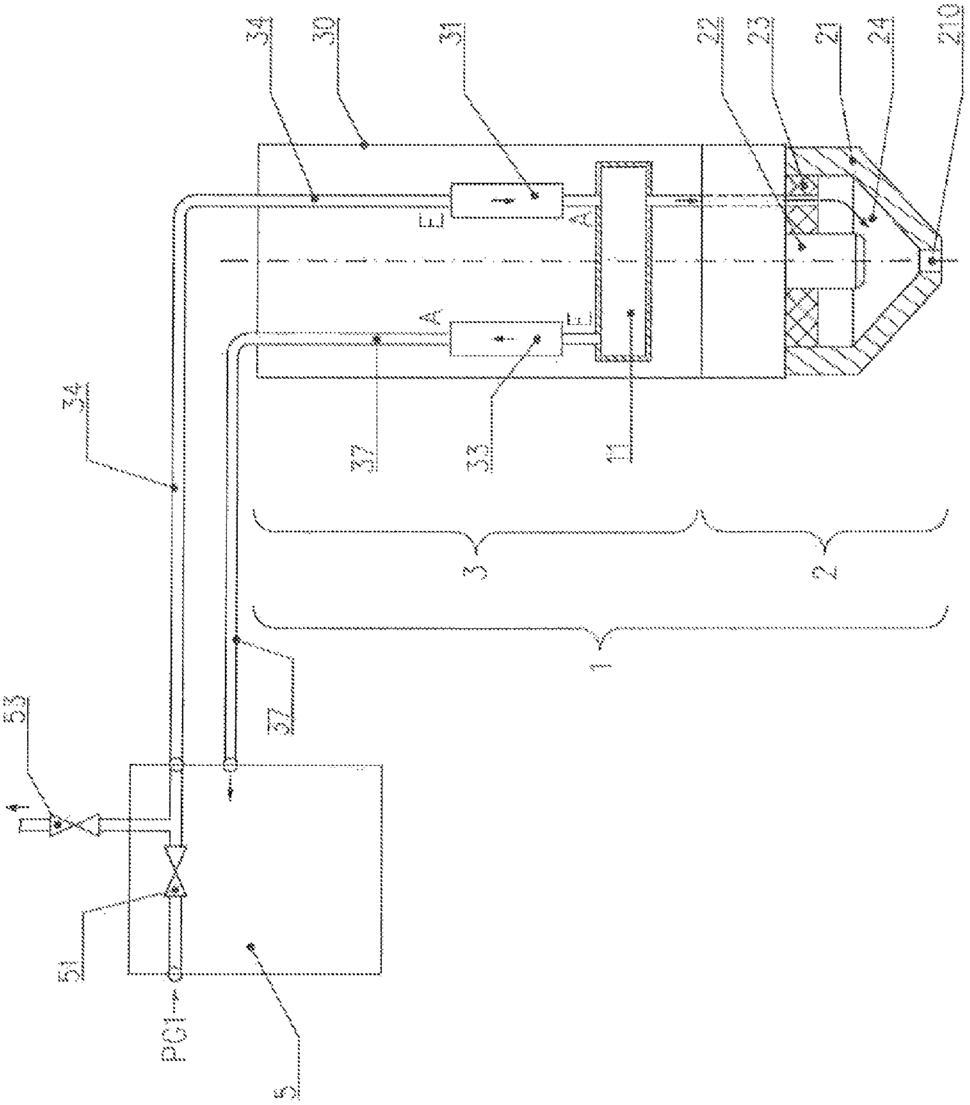
Figure 3:
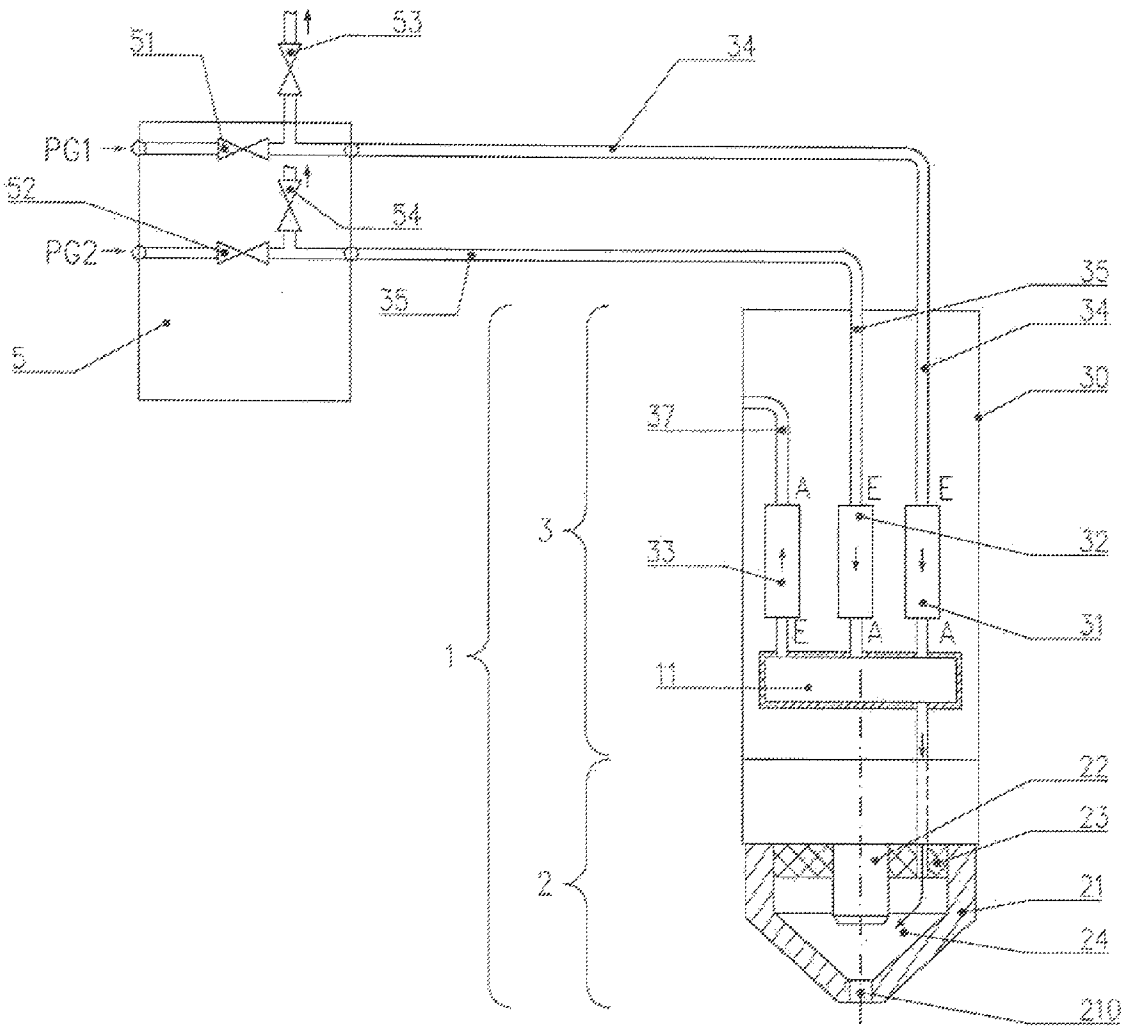
Figure 4:
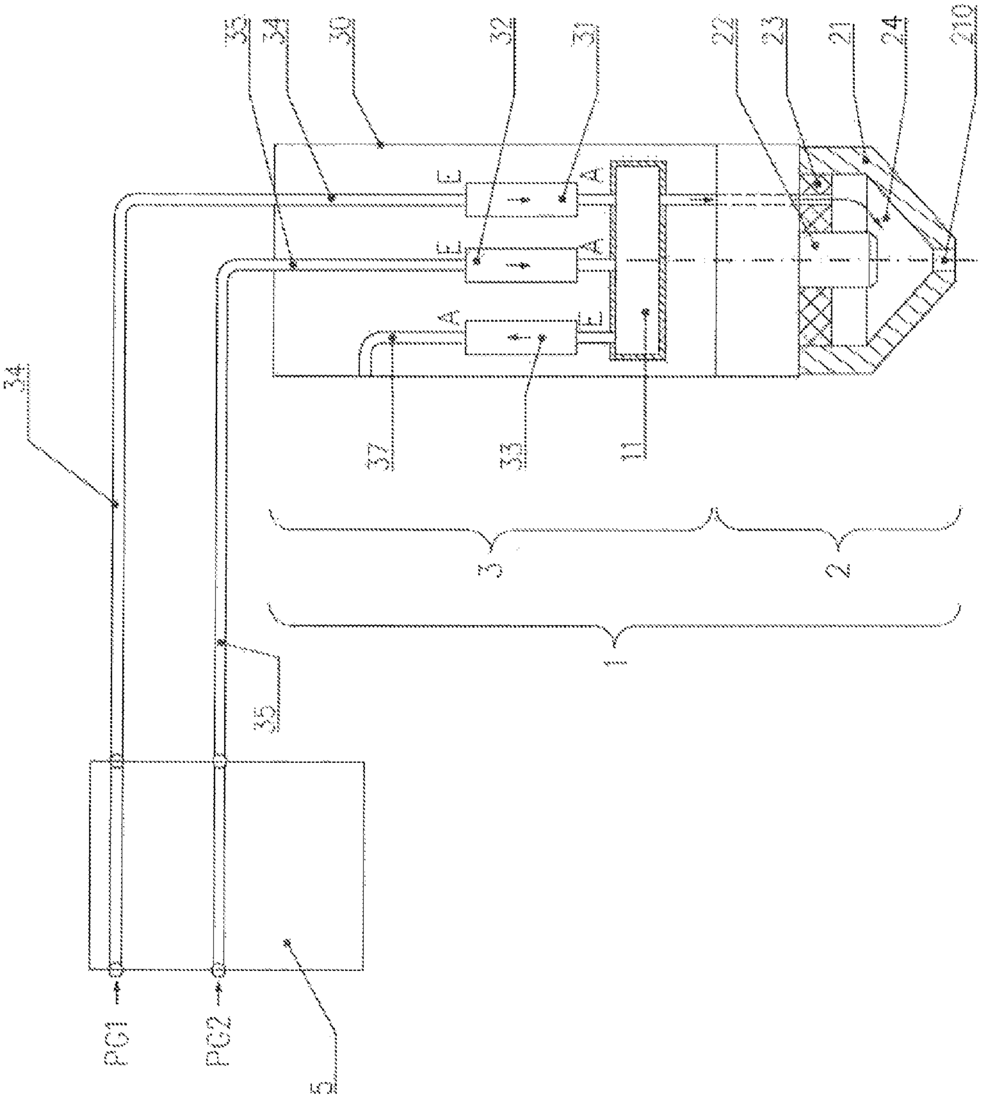
Figure 5:
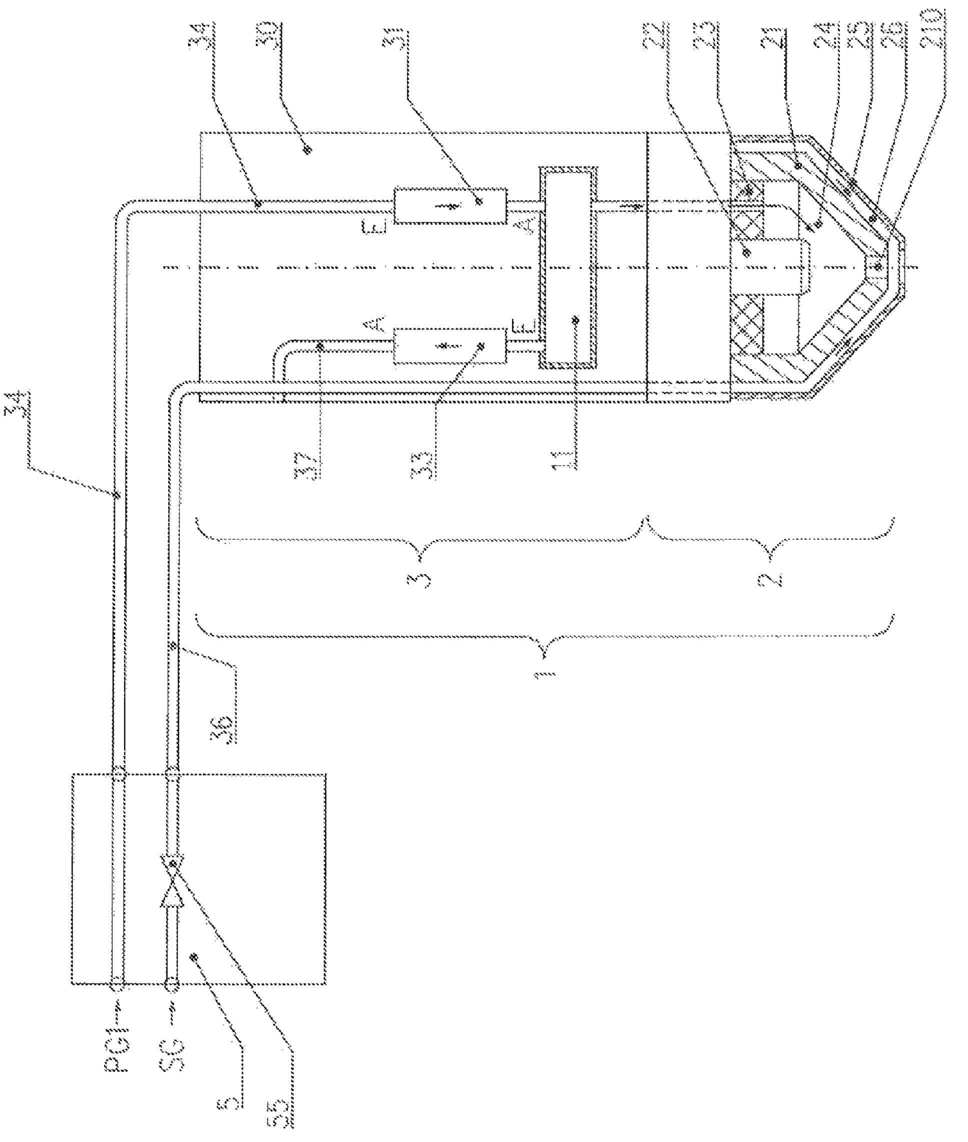
Figure 6:
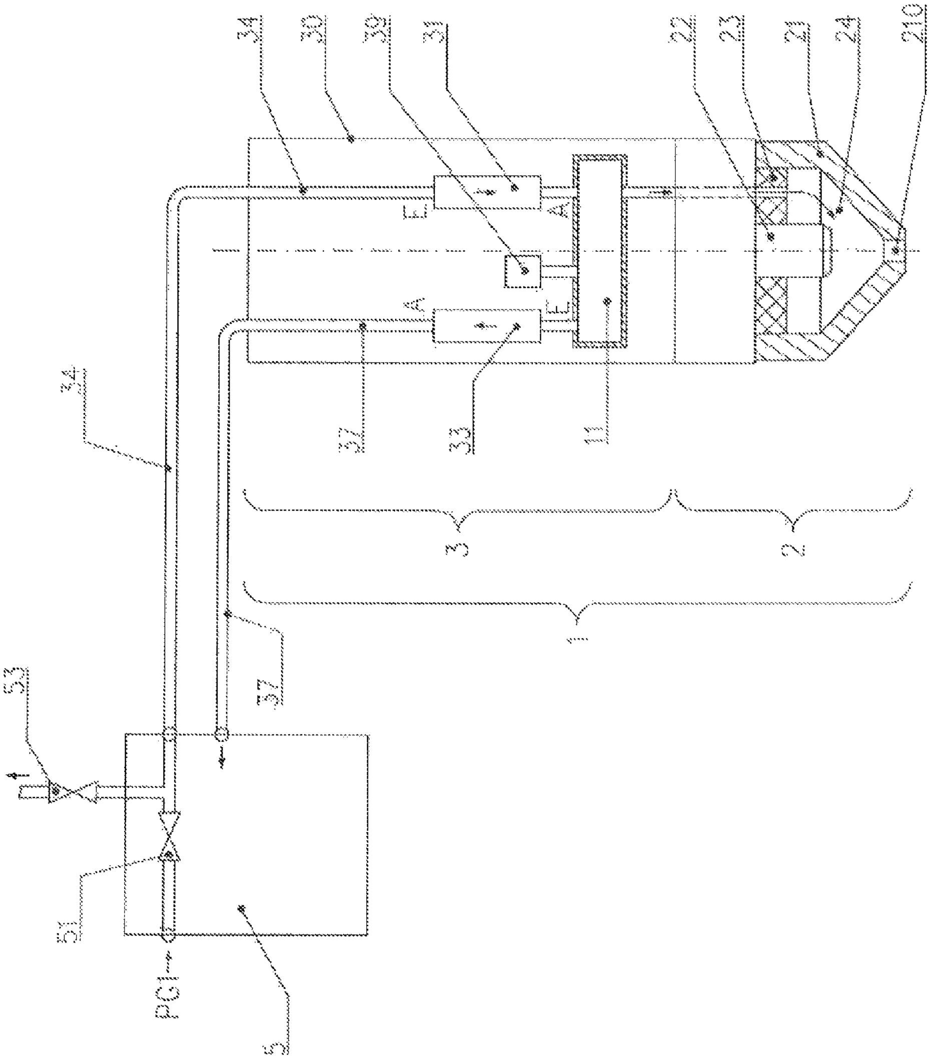
Figure 7:
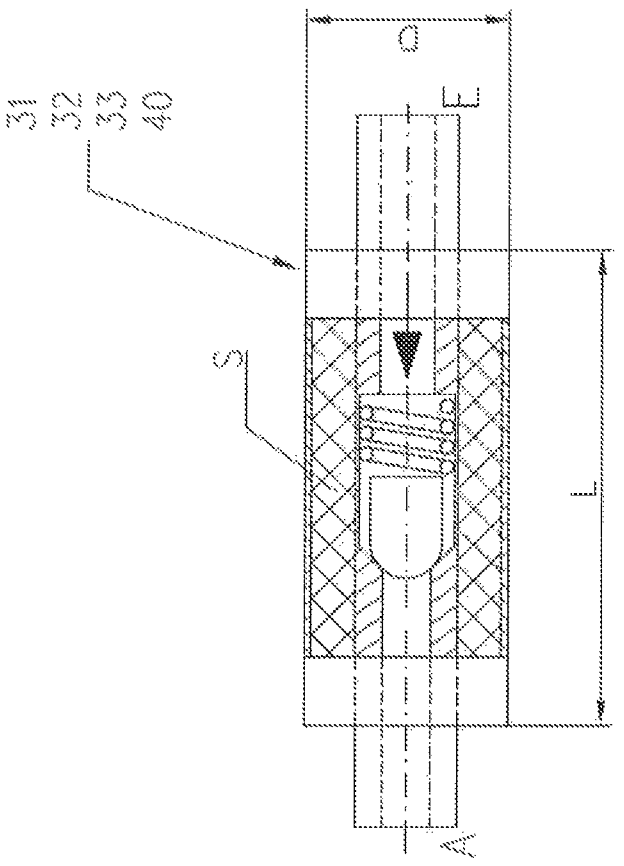
Figure 8:
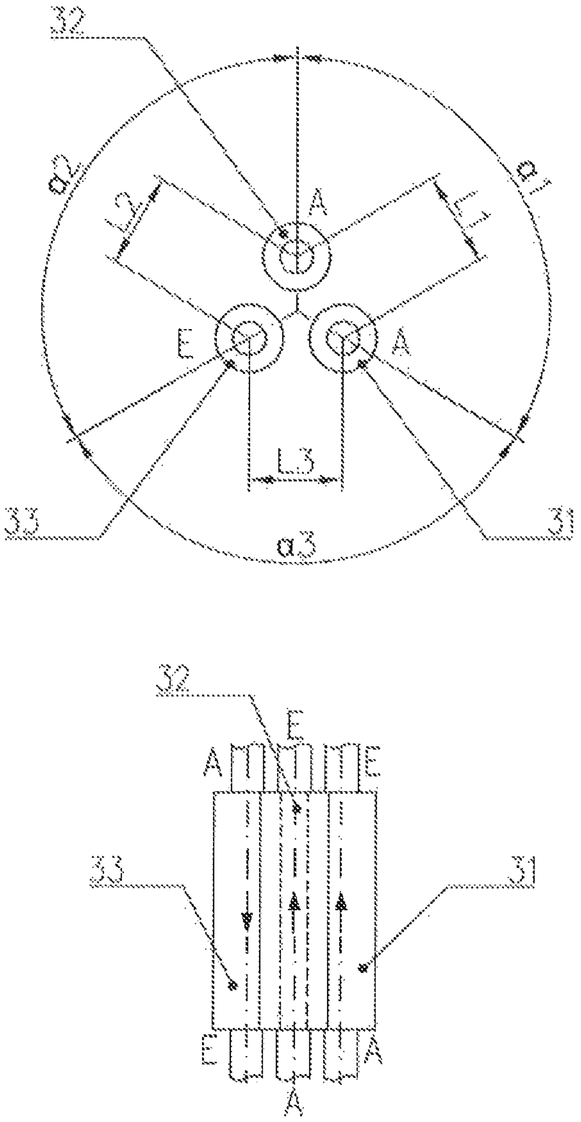
Figure 9:
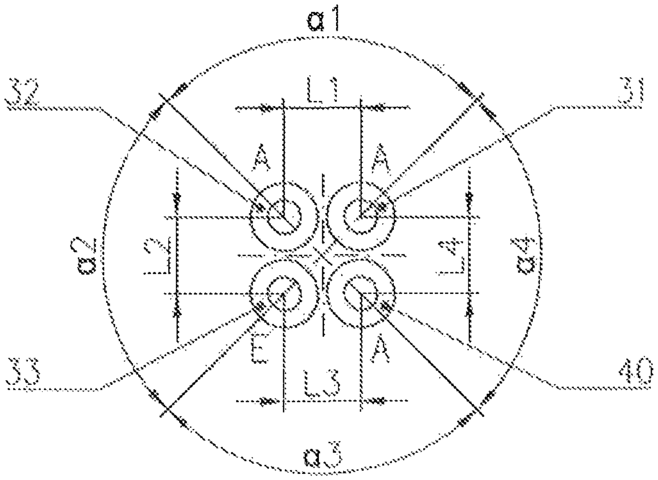

There are shown:

FIG. 1 in schematic form, a sectional representation of an example of a plasma torch in accordance with the invention with a plasma feed;

FIG. 2 in schematic form, a sectional representation of a further example of a plasma torch in accordance with the invention with a plasma feed;

FIG. 3 in schematic form, a sectional representation of an example of a plasma torch in accordance with the invention with two plasma feeds;

FIG. 4 in schematic form, a sectional representation of a further example of a plasma torch in accordance with the invention with two plasma feeds;

FIG. 5 in schematic form, a sectional representation of an example of a plasma torch in accordance with the invention with a plasma feed and a secondary gas feed;

FIG. 6 in schematic form, a sectional representation of a further example of a plasma torch in accordance with the invention with a plasma feed and a pressure sensor;

FIG. 7 a sectional representation of an axial valve which can be used in the invention;

FIG. 8 possibilities for the arrangement of valves within the housing of a plasma torch; and FIG. 9 further possibilities for the arrangement of valves within the housing of a plasma torch.

Examples for the plasma torch 1 are shown in simplified form in the Figures. The media further required for the operation of the plasma torch 1 in addition to the gas, such as electrical current and cooling water, and their supply to the plasma torch 1 are not shown.

FIG. 1 shows a plasma torch 1 having a plasma torch head 2 with a nozzle 21, an electrode 22 and a feed 34 for a plasma gas PG as well as a plasma torch shaft 3 which has a housing 30. In the invention, that is also in all other examples covered by the invention, the plasma torch shaft 3 can be formed in one piece and can only be formed with one correspondingly configured housing 30 at which all the required components can be present and formed.

The feed 34 can be a gas hose outside the housing 30 which is connected to a magnetic valve 51 of a coupling unit 5 for an infeed of plasma gas PG1. A further part of the feed 34 adjoins the gas hose and is formed within the housing 30. The feed 34 is connected to the hollow space 11 within the housing 30. Plasma gas can escape from the space 24 which is formed between the nozzle 21 and the electrode 22 via an opening present at the hollow space 11 and arranged after the valve 33 into the environment or into a connected container through the hollow space 11 when the valve 33 is open. This can take place via the line 37 subsequent to the valve 33. The electrode 22 and the nozzle 21 are arranged at a spacing from one another by the gas guide 23 so that a space 24 is formed within the nozzle 21. The nozzle 21 has a nozzle bore 210 which can vary in its diameter in dependence on the electrical cutting current from 0.5 mm for 20 A up to 7 mm for 800 A. The gas lead 23 likewise has openings or bores (not shown) through which the plasma gas PG flows. They can likewise be configured in different sizes or diameters and even in different numbers.

An electromagnetically operable valve 33 is located in the plasma torch shaft 3 and its inlet is connected to the hollow space 11 so that with an open valve 33 plasma gas can move through the opening out of the hollow space 11 outwardly to the outside of the housing 30 and can there optionally move into a container (not shown) in which a vacuum is present. The inner volume of the hollow space 11 is minimized. It amounts here, for example, to 5 $cm^3$ to 10 $cm^3$. The valve 33 is designed as an axial valve in a small construction shape. For example, it thus has an outer diameter D of 11 mm and a length L of 40 mm. A small electrical power, here approximately 2 W, for example, is required to reduce the warming in the housing 30.

On the Ignition of the electrical arc and during the cutting, the plasma gas PG1 flows through the open valve 51 and the feed 34 into the housing 30 and from there into the hollow space 11.

If the cutting is to be ended, the valve 51 in the coupling unit 5 is first closed. Since the plasma gas PG1 should flow out of the space 24 between the nozzle 21 and the electrode 22 in as short a time as possible to reduce the pressure in this space 24, the valves 53 are opened to vent the feed 34 and the valve 33 is opened for the fast venting of the hollow space 11 and of the space 24. The hollow space 11 and the space 24 are here connected to one another by the openings or bores of the feed 34.

In this respect, the space of the valve 33 surrounded by a winding of the coil S is flowed through by plasma gas PG, whereby it is cooled better. The valve 33 can be arranged in the housing 30 without any further precautionary measures due to the small construction shape, the low required electrical power and the cooling by the flowing plasma gas.

After the venting, the valves 33 and 53 are closed again and the electrical arc can be ignited again. Short venting times which are almost independent of the inner diameter of the nozzle bore 210 and of the bores which are formed in the feed 34 within the housing 30 can be achieved by this arrangement. They would in particular amount to several 100 ms with nozzle bores below 1 mm without the described arrangement. In the embodiment shown, the venting time can be reduced to below 200 ms.

A short venting time is important for a starting of the next cutting process as fast as possible to reduce the pauses between two cutting processes and to increase productivity. In addition, the fast pressure reduction increases the service life of the electrode 22 which otherwise wears more by erosion after extinguishing the electrical arc at a higher plasma pressure in the space 24 and the associated flow of the plasma gas PG1, PG2.

A further gas hose as a line 37 can be connected to the hollow space 11 and to the opening after the valve 33 in the direction of flow and the plasma gas to be removed during a venting can be led off in a defined manner using said gas hose so that the plasma gas can be led to a specific location, for example to a container (not shown). A diaphragm with which the plasma gas flow to be led off during a venting and thus the venting time can be influenced is attached here by way of example in the direction of flow before the inlet side E of the valve 33.

The duration of the venting time is still dependent on the length of the total feed 34, that is also outside the housing 30 and thus on its inner volume, in this embodiment. An example is shown in FIG. 2 where this is no longer the case.

FIG. 2 likewise shows a plasma torch 1. A further valve 31 is additionally located in the housing 30 in the feed 34 before the connection of the hollow space 34 to the feed 34. The outlet of the valve is connected to the hollow space 11.

A valve 33 whose inlet is connected to the hollow space 11 is connected to the hollow space 11 within the housing 30 or is arranged in the opening connected to the hollow space 11 so that a venting can be achieved with an open valve 33. The inner volume of the hollow space 11 is minimized. This inner volume is limited by the valves 31 and 34 and by the gas guide 23, which can be a component of the feed 34, and here amounts by way of example to 5 $cm^3$ to 10 $cm^3$.

The valves 31 and 33 are designed as axial valves in a small construction shape. For example, they thus have an outer diameter D of 11 mm and a length L of 40 mm. A small electrical power, here approximately 2 W, for example, is required to reduce the heat development in the housing 30.

On the ignition of the electrical arc and during the cutting, the plasma gas PG1 flows through the open valve 51 and the feed 34 to the plasma torch 1, through the vale 31 and from there into the hollow space 11.

If the cutting is to be ended, the valve 51 in the coupling unit 5 is first closed. Since the plasma gas PG1 should flow as fast as possible out of the space 24 between the nozzle 21 and the electrode 22 to reduce the pressure in this space 24 in a short time, the valve 31 is closed and the valve 33 is opened for a fast venting of the hollow space 11 and of the space 24. The hollow space 11 and the space 24 are here connected to one another by the openings or bores of the gas feed 23.

In this respect, the volume in the respective valve 31, 33 which surrounds its respective winding of the electrical coil S is flowed through, whereby it is cooled better. The valves can be arranged in the housing 30 due to the small construction shape, the small required electrical power and the cooling by the flowing plasma gas.

After the venting, the valve 33 is closed again and the electrical arc can be reignited. Even shorter venting times which are almost independent of the diameter of the nozzle bore 210, of the bores in the gas guide 23 and of the length of the feed 34 can be achieved by this arrangement. In the embodiment shown, the venting time can be reduced to below 100 ms.

The venting valve 53 is provided in the coupling position 5. This is necessary if the total feed 34 should be vented up to the valve 31. This is e.g. useful when different pressures are required for the plasma gas PG1 between the cutting processes. The arrangement can, however, generally also be used without the valves 51 and 53. A fast venting of the hollow space 11 and of the space 24 can also thus be achieved.

An even faster starting of the next cutting process is possible due to the even shorter venting time. The internal pressure reduction achievable in an even shorter time additionally increases the service life of the electrode 22.

It can, however, be sufficient with large nozzles only to close the valve 31 for venting and not to open the valve 33 and then to operate the plasma torch in a conventional manner.

The corresponding parameters for the cutting can be stored in a database and the routine can be defined whether and when the valve 33 has to be opened. Provision can likewise be made that a diaphragm 38 which has a smaller inner diameter than the smallest inner diameter of the valve 33 through which the plasma gas flows is arranged before the inlet, e.g. between the hollow space 11 and the valve 33 or at or after the outlet of the valve 33. The venting time can thereby likewise be influenced. It is equally possible that the free cross-section of this diaphragm 38 through which the plasma gas can flow is variable. In addition, a further line 37 can be connected to the valve 33 and/or to the diaphragm 38 so that the plasma gas can escape at a specific location, for example outside the housing 30, here at the coupling unit 5, for example. An opening through which the plasma gas can escape can equally be present in the housing 30. This also applies to the examples shown in FIGS. 1 and 3.

It is useful for specific applications that two plasma gases PG1 and PG2 are supplied to the plasma torch 1, e.g. when ignition should be carried out with one plasma gas and cutting with the other. Ignition, for example is carried out with air and cutting with oxygen to reduce the electrode wear. There is equally the possibility of mixing two different plasma gases in the plasma torch 1 or to switch in a second plasma gas during the cutting. This can e.g. be useful when cutting with an argon-hydrogen mixture. Ignition here is carried out with argon and hydrogen is then admixed. A switching over between two plasma gases is, however, equally possible here; for example, ignition is carried out under argon as the plasma gas PG1 and then a switchover is made to an already mixed plasma gas PG2, an argon-hydrogen mixture or an argon-nitrogen mixture or an argon-hydrogen-nitrogen mixture. An arrangement for this is shown by way of example in FIG. 3.

FIG. 3 likewise shows a plasma torch 1. A respective valve 31 and further valve 32 are connected within the housing 30 or are arranged there in the feeds 34 and 35 for different plasma gases in the direction of flow before the connection to the hollow space 11. The inlet of the valve 31 is connected to the feed 34 and the inlet of the valve 32 is connected to the feed 35. The outlets of both valves 31 and 32 are connected to the hollow space 11.

A valve 33 whose inlet is connected to the hollow space 11 is located in the housing 30 so that it can vent the hollow space 11. The volume in the interior of the hollow space 11 is minimized. The volume to be vented is also limited in a certain manner by the volumes of the valves 31 and 34 as well as the gas guide 23 and here amounts to 5 $cm^3$ to 10 $cm^3$, for example.

The valves 31, 32 and 33 are designed as axial valves in a small construction shape. For example, it thus has an outer diameter D of 11 mm and a length L of 40 mm. They require a small electrical power, here approximately 2 W, for example, so that the heating in the housing 30 is reduced.

On the Ignition of the electrical arc and during the pilot arc—the electrical arc burns between the electrode 22 and the nozzle 21—the plasma gas PG1 flows through the open valve 51 and the feed 34 to the plasma torch 1, through the valve 31 and from there into the hollow space 11.

During the cutting, i.e. in particular when the electrical arc burns, the plasma gas PG2 flows between the electrode 22 and the nozzle 21 in the direction of the workpiece through the open valve 52 and the feed to the plasma torch 1, through the valve 32.

There are cases, here, for example, as already previously described, in which a switchover is carried out between two different plasma gases PG1 and PG2 or a second plasma gas PG2 is switched in. In the first case, the valve 31 is then closed and the valve 32 is opened. The valve 51 can be closed, the valve 52 must be open and only plasma gas PG2 flows. This can also take place in an overlapping manner, i.e. both vales are open for a specific time, e.g. 300 ms, to secure a constant gas flow.

In the second case in which cutting is carried out with two plasma gases, for example, with a gas mixture, the plasma gases PG1 and PG2 flow into the nozzle 21.

If the cutting is to be ended in the first case, the valve 52 in the coupling unit 5 is first closed. Since the plasma gas PG2 should flow as fast as possible out of the space 24 between the nozzle 21 and the electrode 22 to reduce the pressure in this space 24 in a short time, the valve 32 is closed and the valve 33 is open for a fast venting of the hollow space 11 and of the space 24. The hollow space 11 and the space 24 are here connected to one another by the openings or bores of the gas feed 23.

If the cutting is to be ended in the second case, the valves 51 and 52 in the coupling unit 5 are first closed. Since the plasma gases PG1 and PG2 should flow out of the space 24 between the nozzle 21 and the electrode 22 as fast as possible to reduce the pressure in this space in a short time, the valves 31 and 32 are closed and the valve 33 is opened for venting the hollow space 11 and the space 24 in a short time. The hollow space 11 and the space 24 are here connected to one another by the openings or bores of the gas feed 23.

In this respect, the volume in the respective valve 31, 33 which surrounds its respective winding of the coil S is flowed through, whereby it is cooled better. The valves can be arranged in the housing 30 without any further additional measures due to the small construction shape, the small required electrical power for the operation and the cooling by the flowing plasma gas.

After the venting, the valve 33 is closed again and the electrical arc can be reignited. Even shorter venting times which are almost independent of the diameter of the nozzle bore 210, of the bores in the gas guide 23 and of the length of the feeds 34 can be achieved by this arrangement. In this example, the venting time can be reduced to below 100 ms.

The venting valves 53 and 54 are provided in the coupling position 5. This is necessary even if the feed 34 should also be vented up to the valve 31 and also the feed 35 for the second plasma gas PG2 should be vented up to the valve 32. This is e.g. useful when different pressures for the plasma gases PG1 and PG2 are required between the cutting processes. The arrangement can, however, generally also be used without the valves 51 and 53. A venting of the hollow space 11 and of the space 24 is thus also achieved in a short time.

There is also the possibility that only the valves 31, 32 and/or 33 arranged in the plasma torch shaft are present and the other valves are not present or are only present in part. This is shown in FIG. 4 by way of example.

FIG. 5 shows a plasma torch 1 which in addition to the plasma gas or gases PG1 and PG2 has a feed 36 for the secondary gas SG, as shown, for example, in DE 10 2004 049 445 B4. The plasma torch 1 then additionally has a nozzle protection cap 25 and the secondary gas SG flows through the space 26 between the nozzle 21 or a nozzle cap 25 which fixes the nozzle 21 in the direction of the electrical arc and can flow around it or also constrict it.

The secondary gas SF is supplied to the plasma torch 1 through the feed 36. A valve 55 switches and influences the secondary gas SG. A valve (not shown) can also be present in the housing 30 for the secondary gas SG, as for the plasma gases PG1 and PG2.

The plasma torch 1 can also be configured as a fast-change torch in which the torch head can be separated from the torch shaft by simple manual manipulations or in an automated manner, as described, for example, in DE 10 2006 038 134 B4.

FIG. 6 shows an arrangement as shown in FIG. 2. In addition, in this respect, a pressure sensor 39 is located in the housing 30 and determines the pressure in the hollow space 11. The measurement result can be passed onto a control and the control of the electrical cutting current or the switching of the vales can thus take place in dependence on the respective determined pressure. The electrical current can be varied in dependence on the respective determined pressure. For example, the electrical current can be increased as the respective specific pressure is increased and can likewise be reduced as the respective specific pressure is reduced. This dependence can take place proportionately or disproportionately, following other mathematical functions. The electrical current can equally be switched off when the respective determined pressure in the hollow space 11 falls below a predefined value.

FIG. 7 shows the greatly simplified design of an axial solenoid valve such as can be used in the invention. The coil S with the windings which can be flowed through by the plasma gas from the inlet B to the outlet A is located in the interior of its body. The mechanism for opening and closing is also arranged in the interior. The body of the solenoid valve has a length L and an outer diameter D. The solenoid valve shown here has a length L of 25 mm and a diameter of 10 mm.

FIG. 8 shows a possible space-saving arrangement of the valves 31, 32 and 33. They are arranged in the housing 30 such that they are each arranged at an angle α1 of 120° in a plane perpendicular to the center line M. The deviation from this angle should not exceed ±30°. The arrangement is thereby space-saving and can be arranged in the housing 30 or in the plasma torch shaft 3. The distances L1, L2 and L3 between the valves 31, 32, 33 are each ≤20 mm. At least one valve of the valves 31, 32 and 33 is arranged with its inlet E opposite to the other valves, i.e. to their outlets A. The oppositely arranged valve is the valve 33 in the hollow space 11 in the example shown.

FIG. 9 shows an arrangement with four valves 31, 32, 33 and 34. They are arranged in the interior of the housing 30 such that they are each arranged in angles α1, α2, α3, α4 of 90° in a plane perpendicular to the center line M. The deviation from these angles should not exceed ±30°. The arrangement is thereby space-saving and can be arranged in the housing 30 or in the plasma torch shaft 3. The distances L1, L2, L3 and L4 between the valves are ≤20 mm.

At least one valve of these valves 31 to 34 is arranged with its inlet E opposite to the other valves, i.e. to their outlets A.

REFERENCE NUMERAL LIST

1 plasma torch
2 plasma torch head
3 plasma torch shaft
5 coupling unit
11 hollow space
21 nozzle
22 electrode
23 gas guide
24 space (between electrode/nozzle)
25 nozzle protection cap
26 space (nozzle-nozzle protection cap)
30 sleeve of plasma torch shaft
31 valve PG1
32 valve PG2
33 valve venting
34 feed PG1
35 feed PG2
36 feed SG
37 line
38 diaphragm
39 pressure sensor
40 valve for SG
51 valve
52 valve
53 valve
54 valve
55 valve
210 nozzle bore
A outlet
D diameter
E inlet
L length
PG1 plasma gas 1
PG2 plasma gas 2
SG secondary gas
S coil
L1-L4 distances of the valves
α1-α4 angles

The invention claimed is:

1. A plasma torch comprising a housing (30) and a plasma torch head connected thereto, said plasma torch head including a nozzle (21) and nozzle opening (210), at least one feed extending into the housing for guiding plasma gas into and through said housing (30) to said nozzle opening (210), a hollow enclosed space (11) positioned within said housing (30) and connected to said at least one feed to receive the plasma gas, said hollow enclosed space including an exit opening to lead plasma gas out of the hollow enclosed space, a valve (33) which opens and closes said exit opening, said valve arranged at said exit opening, and a gas exit (37) connected with said valve to guide plasma gas out of the hollow enclosed space and outside the housing (30) in an open state of said valve (33).

2. A plasma torch in accordance with claim 1, characterized in that said gas exit extends outside the housing (30) and is maintained at a pressure below the pressure in the at least one feed in the region in front of the nozzle opening (210).

3. A plasma torch in accordance with claim 1, characterized in that at least one pressure sensor (39) is arranged within or connected to one or more of said at least one feed, a space (24) formed between said nozzle (21) and an electrode (22) of the plasma torch (1), and said hollow enclosed space (11).

4. A plasma torch in accordance with claim 1, further comprising at least one feed valve for opening and closing said at least one feed.

5. A plasma torch in accordance with claim 1, characterized in that a secondary gas feed (36) for a secondary gas (SG) is guided to the outside through the housing (30), said secondary gas feed extending from a nozzle protection cap (25) and a secondary gas guide (36) formed in the nozzle protection cap (25) next to a plasma jet which exits through the nozzle opening (210), said secondary gas feed having a secondary gas valve (55).

6. A plasma torch in accordance with claim 1, wherein said at least one feed includes a feed valve for opening and closing said at least one feed for a plasma gas, said feed valve arranged within the housing (30) in the direction of flow of the plasma gas and in front of the connection to the hollow enclosed space (11).

7. A plasma torch in accordance with claim 1, characterized in that said valve arranged in the housing (3) has a maximum outer diameter of 15 mm, a maximum length of 50 mm, and the maximum outer diameter of the housing is 52 mm.

8. A plasma torch in accordance with claim 1, wherein said exit opening has a reduced free cross-section in the direction of flow after the valve (33).

9. A plasma torch in accordance with claim 1, characterized in that said housing is incorporated in a plasma torch shaft (3) separable from said plasma torch head (2).

10. A plasma torch in accordance with claim 1, wherein said at least one feed extends out of said hollow enclosed space to enable plasma gas flow between said hollow enclosed space and a space (24) within said nozzle.

11. A plasma torch in accordance with claim 1, wherein said valve is an electromagnetic axial valve.

12. A plasma torch in accordance with claim 11, wherein said electromagnetic axial valve includes a coil to enable plasma gas flow therethrough.

* * * * *